Oct. 7, 1969　　　M. E. SIXT　　　3,471,179
ADAPTER
Filed Dec. 26, 1967　　　2 Sheets-Sheet 1
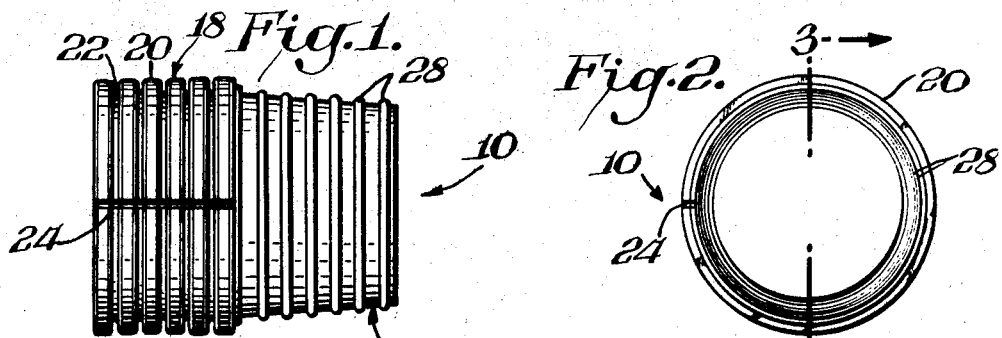
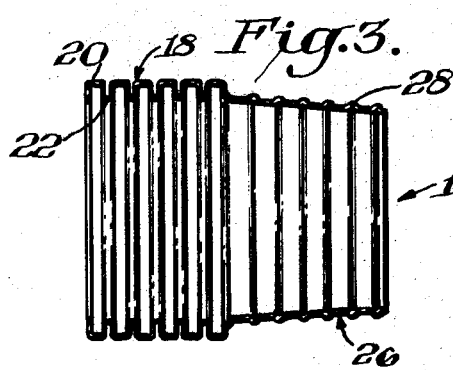
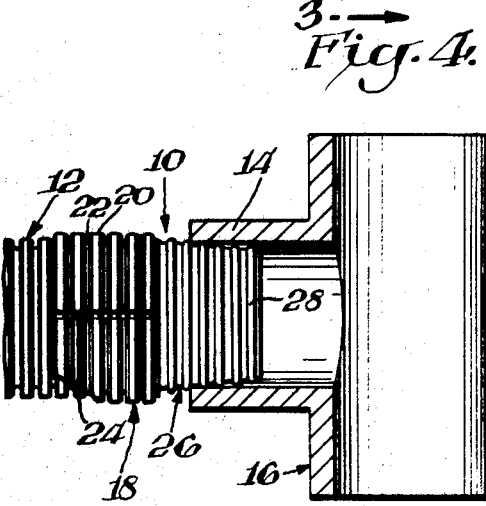
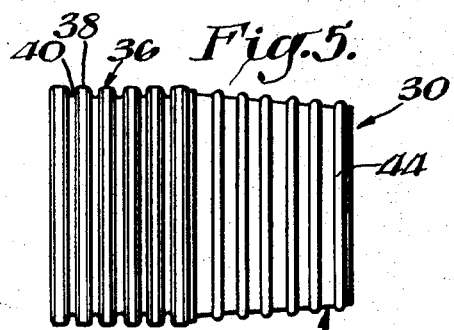
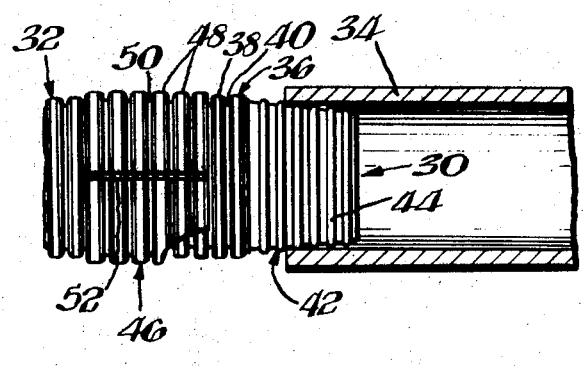

Oct. 7, 1969    M. E. SIXT    3,471,179
ADAPTER
Filed Dec. 26, 1967    2 Sheets-Sheet 2
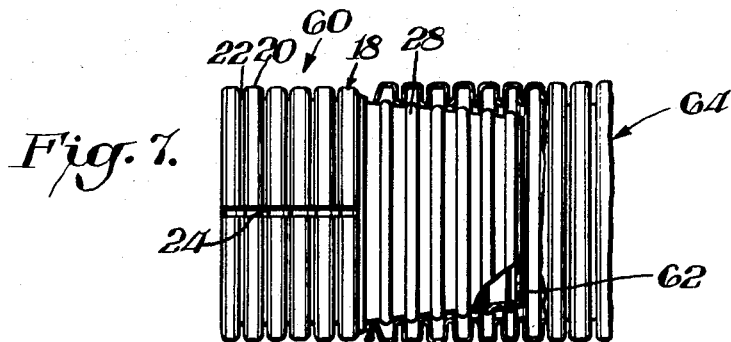
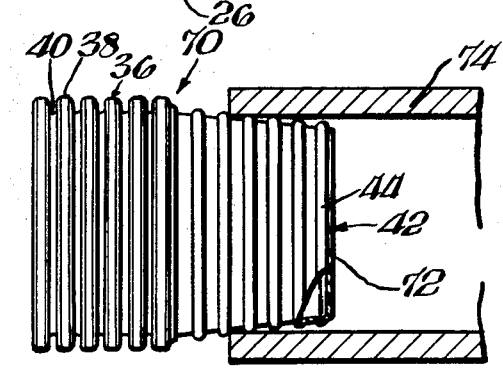
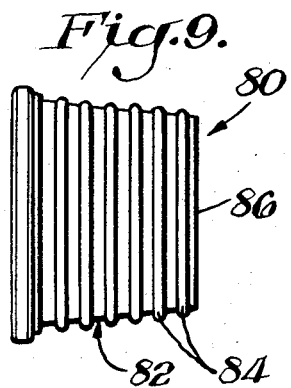
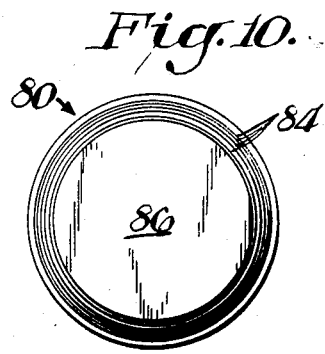

United States Patent Office 3,471,179
Patented Oct. 7, 1969

3,471,179
ADAPTER
Marty E. Sixt, Newark, Del., assignor to Advanced Drainage Systems, Inc., Middletown, Del., a corporation of Delaware
Filed Dec. 26, 1967, Ser. No. 693,630
Int. Cl. F16l 55/00, 21/00, 31/00
U.S. Cl. 285—176                                           6 Claims

ABSTRACT OF THE DISCLOSURE

An adapter for connecting flexible corrugated tubes to smooth-walled or corrugated conduits comprising a corrugated body portion having alternating annular peaks and valleys for connecting the adapter to one end of a flexible corrugated tube. A tapered end portion integrally connected to the corrugated body portion includes a plurality of annular raised ribs spaced from one another along the length of the tapered end portion. The adapter is secured to a conduit by inserting the tapered end portion into the conduit so that the ribs engage the interior surface thereof.

BACKGROUND OF THE INVENTION

The present invention relates to an adapter for constructing networks of flexible corrugated drainage tubes, and more particularly to an adapter for connecting a flexible corrugated drainage tube to a smooth-walled or corrugated conduit.

Prior to the advent of corrugated drainage tubes, land improvement by providing proper drainage was an expensive and time-consuming operation. Red clay tile, commonly used for this purpose in the past, required the piecing together of relatively short lengths to construct the desired drainage network. The disadvantages of such a network were mainly caused by the fragile nature of the tile and the problem of misalignment due to the large number of individual lengths required to construct the desired drainage network. However, despite the disadvantages of red clay tile over a system of corrugated drainage tubes, in some instances it is advantageous to utilize certain red clay tile pieces in conjunction with the flexible corrugated drainage tubes. In this regard, red clay tile T's and Y's are particularly useful due to the difficulty and expense involved in manufacturing these elements of other materials, such as the plastics used to produce the drainage tubes. Thus, it is highly desirable to provide an adapter for connecting flexible corrugated drainage tubes to the T-shaped and Y-shaped connecting pieces utilized in drainage networks.

Accordingly, it is an object of the present invention to provide a simple, economical, easy-to-use and highly reliable adapter for use in the construction of corrugated drainage networks.

SUMMARY OF THE INVENTION

In accordance with the present invention an adapter is provided for connecting flexible corrugated tubes to smooth-walled or corrugated conduits. The adapter comprises a corrugated body portion having alternating annular peaks and valleys for connecting the adapter to one end of a flexible corrugated tube. The adapter also has a tapered end portion integrally connected to the corrugated body portion with a plurality of annular raised ribs spaced from one another along the length of the tapered end portion. The adapter is secured to a smooth-walled or corrugated conduit by inserting the tapered end portion into the conduit so that the ribs engage the interior surface thereof.

In one form of the invention, the ends of the adapter are open and the corrugated body portion includes a longitudinal slit that extends the length of the body portion. The peaks and valleys of that body portion may be constructed and arranged to tightly fit over the corrugations of a tube to be attached thereto. Alternatively, the peaks and valleys of the body portion can have the same dimensions as the corrugations of a tube to be attached thereto. Under these circumstances, a connecting piece may be utilized to secure the body portion of the adapter to the corrugated tube.

Other forms of the invention involve an adapter having an open end adjacent the corrugated body portion and a closed end adjacent the tapered end portion. The corrugated body portion can include a slit that extends the length thereof and the peaks and valleys can be constructed to tightly fit over the corrugations of a tube to be attached thereto. Moreover, the peaks and valleys of the body portion can have the same dimensions as a tube to be attached thereto in which case a separate connector can be employed to positively secure the tube to the corrugated body portion of the adapter.

BRIEF DESCRIPTION OF THE DRAWING

Novel features and advantages of the present invention in addition to those discussed above will become apparent to one skilled in the art from a reading of the following description in conjunction with the accompanying drawing wherein similar reference characters refer to similar parts and in which:

FIGURE 1 is a side elevational view of an adapter according to the present invention;

FIGURE 2 is an end elevational view of the adapter shown in FIGURE 1;

FIGURE 3 is a sectional view taken along line 3—3 of FIGURE 2;

FIGURE 4 is a side elevational view of the adapter shown in FIGURES 1–3 connected between a conduit and a corrugated tube;

FIGURE 5 is a side elevational view of another adapter according to the present invention;

FIGURE 6 is a side elevational view of the adapter shown in FIGURE 5 connected between a conduit and a corrugated tube;

FIGURE 7 is a side elevational view of a blind adapter connected to a corrugated tube with portions broken away to show detail;

FIGURE 8 is a side elevational view of another blind adapter connected to a smooth-walled conduit with portions broken away to show detail;

FIGURE 9 is a side elevational view of still another blind adapter according to the present invention; and FIGURE 10 is an end elevational view of the adapter shown in FIGURE 9.

DETAILED DESCRIPTION OF THE INVENTION

Referring in more particularity to the drawing, FIGURES 1–4 illustrate an adapter 10 for use in connecting a flexible corrugated tube 12 to a conduit, such as the smooth-walled conduit 14 of the T-shaped piece 16. The adapter is constructed of plastic material, such as polyethylene, and can be fabricated according to well-known molding techniques. Other materials and manufacturing methods are also suitable. Adapter 10 comprises a corrugated body portion 18 having alternating annular peaks and valleys, 20 and 22, respectively. The corrugated body is designed for attachment to one end of the flexible corrugated tube 12, and in this regard, the body portion 18 has a longitudinal slit 24 that extends the length thereof. The peaks 20 and valleys 22 of the corrugated body portion are constructed and arranged to tightly fit over the corrugations at one end of the flexible tube 12. Thus, the tube 12 is easily secured to the adapter by spreading the corrugated body portion 18 apart until its interior dimension is slightly larger than the exterior dimension of the tube 12. The tube is then positioned within the corrugated body portion 18 and the force utilized to spread the body portion apart is released whereby the body portion assumes its normal configuration and surrounds the end of the tube.

Adapter 10 also includes a tapered end portion 26 integrally connected to the corrugated body portion 18. The tapered end portion has a plurality of annular raised ribs 28 spaced from one another along its length. The ends of the adapter are open so that communication is established between the conduit 14 and the interior of the flexible tube 12 when the adapter is positioned therebetween. In this regard, the tapered end portion 26 has a maximum cross-section greater than the cross-section of the conduit 14. Further, the minimum cross-section of the tapered end portion is somewhat less than the cross-section of the conduit. Accordingly, when the tapered end portion is urged into the conduit the annular ribs 28 engage the inside of the conduit to anchor the adapter thereto.

FIGURES 5 and 6 illustrate another adapter 30 for connecting a flexible corrugated tube 32 to a conduit, such as the smooth-walled conduit 34. The adapter has a corrugated body portion 36 with alternating annular peaks 38 and valleys 40. Additionally, the adapter 30 includes a tapered end portion 42 integrally connected to the body portion 36. The tapered end portion has a plurality of annular ribs 44 similar to the ribs 28 on the tapered end portion 26 of adapter 10. The end portion 42 of the adapter 30 is secured to the conduit 34 in the same manner as described above in conjunction with the adapter shown in FIGURES 1–4.

However, the corrugated body portion 36 of adapter 30 is unlike the corresponding portion of adapter 10, and in this regard, the annular peaks and valleys 38, 40 have the same dimensions as the corrugations of the flexible tube 32. Attachment of one end of the tube 32 to the corrugated body portion 36 of adapter 30 is accomplished by providing a flexible coupling 46 having alternating annular peaks 48 and valleys 50. The connector 46 has a longitudinal slit 52 across its length and the peaks and valleys are dimensioned to fit tightly over the corrugations of both the adapter and the flexible tube 32. As can readily be understood, the flexible connector 46 is opened slightly so that its interior dimension is slightly larger than the exterior dimension of the tube 32 and the corrugated body portion 36. The tube 32 is then positioned adjacent the end of the corrugated body portion with the connector surrounding the end portions of both the tube and the corrugated body portions, as shown in FIGURE 6. The force utilized to open the connector is then released and the connector assumes its normal shape with the peaks and valleys 48, 50 surrounding the corrugations on both the tube 32 and the body portion 36.

FIGURE 7 illustrates a blind adapter 60 according to the present invention. The blind adapter 60 is similar to the adapter 10 illustrated in FIGURES 1–4, with similar parts identified by similar reference characters, except that the end of adapter 60 adjacent the tapered end portion 26 is closed by an end wall 62. The blind adapter 60 can be utilized to plug the end of a flexible corrugated tube, such as 64, in the manner clearly illustrated in FIGURE 7.

FIGURE 8 illustrates another blind adapter 70 according to the present invention similar to the adapter 30 shown in FIGURES 5 and 6, with similar parts identified by like reference characters. However, unlike adapter 30 the end of the adapter 70 adjacent the tapered end portion 42 is closed by an end wall 72. Adapter 70 can be connected to a smooth-walled conduit 74 in the same manner the adapter 30 is connected to the conduit 34. A plugging function similar to the function of adapter 60 is accomplished through utilization of the adapter 70.

Both of the blind adapters shown in FIGURES 7 and 8 are suitable for use as plugs for capping the end of a smooth-walled or corrugated conduit. Additionally, the corrugated body portions of these adapters can be connected to corrugated tubes in the same manner as described above in conjunction with FIGURES 1–6. Although their primary function is one of a plug, the blind adapters may also be utilized for connecting a corrugated tube to a smooth-walled or corrugated conduit. By using a blind adapter, such as 60 or 70, a corrugated tube can be connected to a smooth-walled or corrugated conduit with a plug therebetween.

FIGURES 9 and 10 illustrate a plug 80 for capping the end of a smooth-walled or corrugated conduit. The plug 80 comprises a tapered body portion 82 having a series of annular raised ribs 84 with an end wall 86 adjacent the narrow end of the plug. In use, the plug 80 is inserted into the open end of a smooth-walled or corrugated conduit to cap the conduit in the same manner as the tapered end portions of the adapters 60 and 70 perform their plugging function.

What is claimed is:

1. An adapter constructed of flexible material for connecting a flexible corrugated tube to a conduit, the adapter comprising a corrugated body portion having alternating substantially circumferentially continuous annular peaks and valleys for connecting the adapter to one end of a flexible corrugated tube, a tapered end portion integrally connected to the corrugated body portion including a plurality of annular raised circumferentially continuous ribs spaced from one another along the length of the tapered end portion for securing the adapter to a conduit by inserting the tapered end portion into the conduit so that the ribs engage the interior surface thereof, and a longitudinal slit in the corrugated body portion that extends the length of the body portion, the peaks and valleys of the body portion being constructed and arranged to tightly fit over the corrugations of a tube to be attached thereto and the adapter being thin-walled whereby the corrugated body portion is expanded outwardly until the valleys of the corrugations are slightly larger than the peaks of a corrugated tube to facilitate connection thereto.

2. An adapter as in claim 1 wherein the ends are open.

3. An adapter as in claim 1 having an open end adjacent the corrugated body portion and a closed end adjacent the tapered end portion.

4. A coupling constructed of flexible material for connecting a flexible corrugated tube to a conduit, the coupling comprising a flexible corrugated longitudinally split sleeve and a flexible adapter, the adapter including a corrugated body portion having alternating circumferentially continuous annular peaks and valleys connecting the adapter to one end of the flexible corrugated sleeve, a tapered end portion integrally connected to the corrugated body portion including a plurality of annular raised circumferentially continuous ribs spaced from one another along the length of the tapered end portion for securing the adapter to a conduit by inserting the tapered end portion into the conduit so that the ribs engage the interior surface thereof, and the alternating circumferentially continuous annular peaks and valleys of the body portion having the same dimensions as the corrugations of a tube to be attached thereto, the peaks and valleys of the sleeve being constructed and arranged to tightly fit over the corrugations of the adapter and the corrugated tube.

5. A coupling as in claim 4 wherein the ends of the adapter are open.

6. A coupling as in claim 4 wherein the adapter has an open end adjacent the corrugated body portion and the closed end adjacent the tapered end portion.

(References on following page)

References Cited

UNITED STATES PATENTS

| | | | |
|---|---|---|---|
| 528,167 | 10/1894 | Jones | 285—177 X |
| 658,313 | 9/1900 | Bernardi | 285—177 X |
| 935,971 | 10/1909 | Haas. | |
| 1,306,641 | 6/1919 | Steenstrup. | |
| 1,668,315 | 5/1928 | Hein | 285—238 X |
| 2,315,792 | 4/1943 | Hoss | 285—175 |
| 2,366,067 | 12/1944 | Smith. | |
| 2,507,536 | 5/1950 | Goodson | 285—176 X |
| 3,167,330 | 1/1965 | Draudt. | |
| 3,276,639 | 10/1966 | Lancaster | 285—238 X |
| 3,239,254 | 3/1966 | Campbell. | |

FOREIGN PATENTS

| | | |
|---|---|---|
| 908,541 | 9/1945 | France. |
| 28,632 | 1903 | Great Britain. |
| 594,227 | 3/1959 | Italy. |

THOMAS F. CALLAGHAN, Primary Examiner

U.S. Cl. X.R.

138—89; 285—237, 260, 419